(12) United States Patent
Scherbarth

(10) Patent No.: US 6,733,214 B2
(45) Date of Patent: May 11, 2004

(54) MILLING TOOL AND CUTTING BIT THEREFOR

(75) Inventor: Stefan Scherbarth, Neuss (DE)

(73) Assignee: Sandvik AB, Sandviken (SE)

( * ) Notice: Subject to any disclaimer, the term of this patent is extended or adjusted under 35 U.S.C. 154(b) by 39 days.

(21) Appl. No.: 10/214,364

(22) Filed: Aug. 8, 2002

(65) Prior Publication Data

US 2003/0039519 A1 Feb. 27, 2003

(30) Foreign Application Priority Data

Aug. 8, 2001 (DE) .......................... 101 38 896

(51) Int. Cl.[7] .............................. B23B 27/22; B23C 5/00
(52) U.S. Cl. .......................... 407/113; 407/40; 407/42; 407/103
(58) Field of Search ..................... 407/40, 42, 103, 407/101, 113, 53, 34, 47

(56) References Cited

U.S. PATENT DOCUMENTS 4,047,826 A * 9/1977 Bennett ........................ 408/59
5,028,177 A * 7/1991 Meskin et al. ............... 408/145
5,827,016 A 10/1998 Strand
6,004,081 A 12/1999 Hellström et al.
6,543,970 B1 * 4/2003 Qvarth et al. ................ 407/114
6,607,335 B2 * 8/2003 Morgulis ...................... 407/40

* cited by examiner

*Primary Examiner*—Willmon Fridie, Jr.
(74) *Attorney, Agent, or Firm*—Burns, Doane, Swecker & Mathis, LLP

(57) ABSTRACT

A cutting bit for a milling tool includes a flat upper face which at least partially serves as a rake face, and a lower support face which is substantially parallel thereto. The upper face and the lower face are connected together by a peripherally extending edge face. The edge surface includes six sides each interconnecting the upper and lower faces. Each side includes first and second faces oriented in non-coplanar relationship, wherein each first face intersects the upper face to form therewith a secondary cutting edge, and each second face intersects the upper face to form therewith a main cutting edge arranged non-colinearly with respect to the secondary cutting edge. A alternating ones of the first faces form a first angle of substantially 60° to one another, and alternating ones of the second faces form a second angle of substantially 60° to one another.

15 Claims, 2 Drawing Sheets

MILLING TOOL AND CUTTING BIT THEREFOR

This application claims priority under 35 U.S.C. §§119 and/or 365 to patent application Ser. No. 101 38 896.9 filed in Germany on Aug. 8, 2001, the entire content of which is hereby incorporated by reference.

BACKGROUND OF THE INVENTION

The present invention concerns a cutting bit for milling, comprising an upper face which at least partially serves as a rake face and a lower support face which is substantially parallel thereto, wherein the upper face and the lower face are connected together by a peripherally extending edge face. The upper face is of a substantially hexagonal peripheral shape and at its intersection with the edge face defines cutting edges, wherein the edge face at least in its region adjoining the cutting edges defines at least six clearance faces which are respectively angled through about 60° relative to each other.

The present invention also concerns a milling tool having a cutting bit carrier for accommodating corresponding cutting bits.

Substantially hexagonal cutting bits with a hexagonal basic shape are known in principle, thus for example from U.S. Pat. No. 6,004,081, which besides hexagonal also discloses octagonal cutting bits or quadrangular cutting bits, the corners of which are markedly chamfered by bevels. U.S. Pat. No. 5,827,016 also discloses a polygonal and in particular octagonal cutting bit which is intended in particular for use on milling tools.

In the case of milling tools, in particular in the case of surface or planer milling machines, cutting bits are frequently arranged along the periphery of an end of a rotating cutting bit carrier in such a way that a front cutting edge portion which is radially furthest outward defines the active cutting edge which in the milling operation removes material in the form of chips from the workpiece to be machined (which is generally a metal workpiece). In that situation, while the tool is rotating about an axis of symmetry, the tool is moved perpendicularly to that axis and generally parallel to the surface of the workpiece, in which case the cutting bits penetrate into the material and remove it with a cutting action.

The cutting bits generally comprise hard metal, cermet or hard ceramic, in particular sintered carbides, but also other metallic or ceramic materials, possibly with hard coatings. It is also possible to use polycrystalline diamond (PCD) or cubic boronitride (CBN) as the cutting material.

Corresponding cutting bits are admittedly extremely hard and wear-resistant, but to achieve maximum productivity they are also very heavily loaded so that, in spite of their great hardness and resistance to wear, under intensive use they often exhibit considerable traces of wear after just a few hours. As such cutting bits are relatively complicated and expensive to produce, they are also correspondingly costly so that obviously the attempt is made to handle a given machining volume with a minimum consumption of cutting bits. For that purpose very many cutting bits are in the form of what are known as 'reversible cutting plates', that is to say they each have a plurality of cutting edges, only one of which is active in use at any given time, while the others do not in practice come into contact with the workpiece, by virtue of their arrangement. After one of the cutting edges is worn the cutting bit is then suitably turned or 'indexed' so that now another cutting edge which has not been used hitherto assumes the position of the active cutting edge and the previous active cutting edge changes into the position of one of the non-active cutting edges. That can continue until all cutting edges on a cutting bit are worn.

There are cutting bits having two, three, four and even more cutting edges, as has already been described above. It will be appreciated that the cutting bits can be used in a correspondingly more economical fashion, the more cutting edges they have. However, limits are set in this respect by virtue of purely geometrical conditions and for example also the reaction forces which occur in the milling procedure. In specific terms, this means that the cutting edge cannot be inclined at just any shallow angle, with respect to the working plane, that is to say the plane which the milling tool produces on the workpiece, if on the one hand a good material removal rate is still to be achieved, but on the other hand the reaction forces should also not become excessive. Severe reaction forces result in vibration of the tool and thus shock-like engagement of the cutting edges and can in that respect considerably speed up the rate of wear of the cutting edges. For that reason the cutting edges are generally set through at least 45° with respect to the workpiece surface produced, which means that a corresponding cutting bit could be at a maximum of an octagonal configuration, if it is admitted that in that case a cutting edge which is most closely adjacent to the active cutting edge already comes into engagement with the workpiece surface which is being produced by the corner of the active cutting edge, being the corner which is axially furthest projecting.

More specifically it is frequently wanted that the surface produced by the axially furthest projecting cutting corner is as flat as possible from the outset and does not have any particular roughness or grooves as can otherwise occur if a for example rectangular or square cutting bit is set at an angle (inclined) with respect to the feed direction or the working face. At the same time, a relatively high feed speed is selected so that the cutting corner of a subsequent cutting bit, with respect to the cutting bit which precedes it on the workpiece, is already displaced a distance in the feed direction, when it comes into engagement with the workpiece. For that reason what are referred to as 'parallel lands' are generally provided in the corner regions of corresponding cutting bits, that is to say rectilinear chamfers on an otherwise for example right-angled (possibly also slightly rounded) transition between two adjacent main cutting edges, wherein the cutting bit is so set in its working position that the bevel is disposed in a plane which corresponds precisely to the feed plane while the adjoining cutting edge is correspondingly set, that is to say in the case of a regular quadrangular cutting bit with parallel lands angled through 45°, at about 45°. Such a cutting bit admittedly appears octagonal in plan view, but it is only each second one of its edges that serves as a cutting edge and the interposed chamfers serve as parallel lands. Therefore even such a cutting bit can be turned a maximum of four times in each case through 90° order after a main cutting edge has worn to bring the next, as yet unworn cutting edge into operation. Insofar as that technology is substantially applied to hexagonal cutting bits, as for example in the case of U.S. Pat. No. 6,004,081, that means a very shallow setting angle of the cutting edge relative to the workpiece of less than 45°, which is disadvantageous for the reasons already referred to above, as it results in substantial, irregular reaction forces.

The quality of the surface produced by such a milling tool also heavily depends inter alia on the exact configuration and angular orientation of the parallel land. If the parallel land still has a certain inclination with respect to the plane produced on the workpiece, that results in more severe residual roughness of the surface produced and/or more severe reaction forces and vibration of the tool.

In comparison with that state of the art, the object of the present invention is to provide a cutting bit having the features set forth in the opening part of this specification, which is highly productive insofar as it has a maximum number of cutting edges which are interchangeable by turning and is thus inexpensive, but which nonetheless at the same time gives rise to only low reaction forces and can thus also be operated in less powerful machine tools at a high speed of rotation and in that case produces precise and smooth surface structures on the workpiece.

SUMMARY OF THE INVENTION

That object is attained in that the intersection of the upper face with the clearance face beside the main cutting edges respectively associated with a side of the hexagon defines, at least in part, also parallel lands extending along the sides of the hexagon, and the cutting bit has pairs of respectively active contact faces which are defined on each two clearance faces, between which there is at least one further clearance face and which include with each other an angle of about 60°.

Here the term 'main cutting edges associated with the sides of the hexagon' means main teeth or main cutting edges which extend parallel or almost parallel to one of the sides of the basic hexagonal shape. The same applies in regard to the parallel lands which also extend parallel or almost parallel to one of the sides of the basic hexagonal shape. That basic hexagonal shape in turn is afforded for example by connection of the cutting corners or equivalent points at the cutting edges.

The cutting bit according to the invention is therefore substantially hexagonal. In this case the limitation 'substantially' relates not only to the fact that production-engineering inaccuracies may occur or that sharp corner transitions are avoided by small rounded configurations or chamfer configurations at the corners of the basic hexagonal shape, but also the fact that, when considered closely, the cutting bit is not exactly hexagonal and in particular is also not of mirror-symmetrical configuration with respect to a diagonal through oppositely disposed corners or generally with respect to a mirror plane which contains the axis of the cutting bit. It will be noted that the cutting bit has at least a three-fold, and preferably six-fold, axis of symmetry, that is to say upon rotation through 120° and preferably already upon rotation through 60° the cutting bit changes over precisely into itself. However the individual sides of the hexagon do not extend precisely straight but have a small bend which separates a main cutting edge from a remaining portion of the side of the hexagon in question. The parallel lands are defined either by that part of the intersection line between the edge surface and the upper side, which is slightly bent with respect to a main cutting edge, or however by a complete side of the hexagon if the wish is to have a particularly long parallel land. A respectively active cutting edge and the corresponding active parallel land are however not angled relative to each other through 60° but through a smaller angle than 60°, in particular an angle in the range of between 50° and 59°, preferably the angle being in the range of between 54° and 59° or also in the range of between 55° and 58°.

A preferred embodiment of the invention provides that adjoining an active cutting corner on the one hand are an active main cutting edge and on the other hand an active parallel land which is angled with respect to the active main cutting edge by a smaller angle than 60°, as already mentioned, specifically by an angle of between 50° and 59°.

In an alternative configuration of the invention provided along one side of the basic hexagonal shape, starting from an active cutting corner, there is initially an active cutting edge which is adjoined prior to the next following non-active cutting corner by a (non-active) parallel land which is angled through a small angle δ of between 1° and 10° with respect to the main cutting edge. That parallel land is followed by the next non-active cutting corner which is in turn adjoined by a cutting edge and so forth. In specific terms that means that, together with an active main cutting edge provided along a side of the hexagon, that parallel land which adjoins a cutting edge of an adjacent side of the hexagon is active, wherein a cutting corner (of the basic hexagonal shape) is disposed between the active cutting edge and the active parallel land and the parallel land is oriented in parallel relationship with the workpiece surface. The main cutting edge which adjoins an active parallel land at the same side of the hexagon is angled with respect to the parallel land through the angle δ and is thus not active in that condition. In contrast the cutting edge in adjoining relationship on the other side of the parallel land is active, with the interposed cutting corner and a setting angle $K_r$ of between 50° and 59°.

In another variant of the present invention one of the sides of the hexagon forms, substantially in its entire length, a parallel land so that there is practically no further space for a main cutting edge at that side of the hexagon. The main cutting edge adjoining the next cutting corner is however angled with respect to the side of the hexagon forming the parallel land, not through 60°, but through a smaller angle, as already mentioned once again in the range of between 50° and 59°. So that, overall, the hexagonal six-fold symmetry is maintained, however, a corresponding transition must then be provided at the main cutting edge in the direction of the next non-active cutting corner, that is to say, the side of the triangle which then follows (which is not active) and which again forms a parallel land is inclined with respect to the preceding (active) main cutting edge through an angle of more than 60°, in more specific terms in the range of between 70° and 61°.

Such a cutting bit admittedly has only three active cutting edges, but at the same time it has a very long parallel land and thus is designed for particularly high feed speeds, which in many cases compensates for the disadvantage of the overall faster rate of wear of such a reversible cutting plate.

Desirably the clearance faces which belong to the parallel lands are slightly angled with respect to the clearance faces which belong to the main cutting edges. In a particularly preferred embodiment this is effected in such a way that the axial clearance angle of an (active) parallel land is greater than the axial clearance angle of the (non-active) main cutting edge adjoining same.

The preferred embodiment of the invention has the contact faces at the clearance faces of the parallel lands, and more particularly in pairs at such edge face portions, for example clearance faces of the parallel lands which substantially include an angle of about 60° with each other. In spite of the slight asymmetry of the edge configurations, mutually corresponding portions of the clearance faces or also the main cutting edges and the parallel lands always involve precise hexagonal symmetry and in regard to successive sides are angled through 60° relative to each other, that is to say they include an angle of 120° therebetween. Therefore edge face portions which include an angle of 60° with each other and which in the present case respectively define a pair contact faces, are always edge faces which are separated by a further, interposed (similar) edge face of the hexagon.

It is particularly preferred if the contact faces provided at the clearance faces of the parallel lands are face portions which project somewhat with respect to the plane of the clearance faces. Those faces which are produced by free working of the clearance faces can be produced more easily and more precisely, by virtue of their smaller size, than if the entire clearance face is used as a contact face. In that way the position of the cutting bit is better defined, which also results in more uniform and smoother operation of the tool in use.

The corresponding milling tool is characterised in that it has receiving means designed to accommodate the cutting bits according to the invention, and in particular therefore also has V-shaped contact faces which can come into contact with the contact faces of the cutting bits.

In that respect the preferred embodiment of the milling tool provides that the receiving means for the cutting bits are of such an arrangement and configuration that the cutting bit has a positive axial and a negative radial rake angle. In other words the active cutting edge operates with a negative radial rake angle (wherein the effective rake angle initially remains disregarded here, by virtue of structures of the upper face, in particular chip forming devices and the like), while the simultaneously active parallel land cuts with a positive rake angle. That reduces the cutting forces at the parallel land and thereby results in a smoother, better-defined surface.

In addition the receiving means on the milling tool is of such a configuration that the setting angle of the main cutting edge is in the range of between 50° and 59° and at the same time the setting angle of the active parallel land is 0°, in other words the parallel land extends parallel to the feed direction of the milling cutter, that is to say in a plane perpendicularly to the axis of rotation of the milling tool, in which respect the possibility of the milling cutting occasionally also performing slight axial feed movements should not be excluded.

BRIEF DESCRIPTION OF THE DRAWINGS

Further advantages, features and possible uses of the present invention will be clearly apparent from the description hereinafter of a preferred embodiment and the accompanying drawings in which.

DETAILED DESCRIPTION OF PREFERRED EMBODIMENTS OF THE INVENTION

Figure 1:
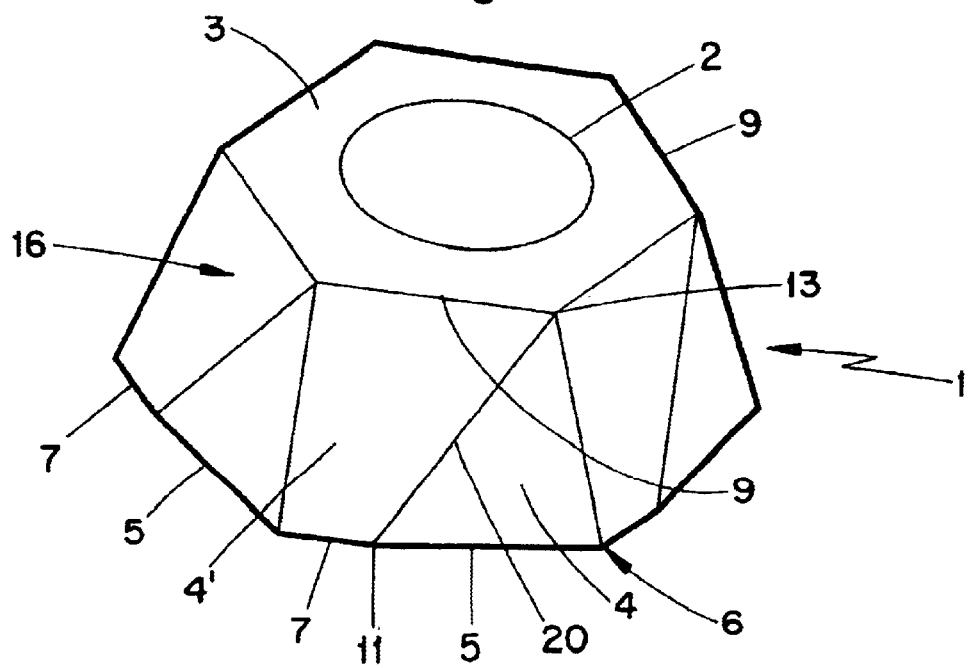
FIG. 1 is a perspective, substantially diagrammatic view of a cutting bit according to the invention.
Figure 3A:
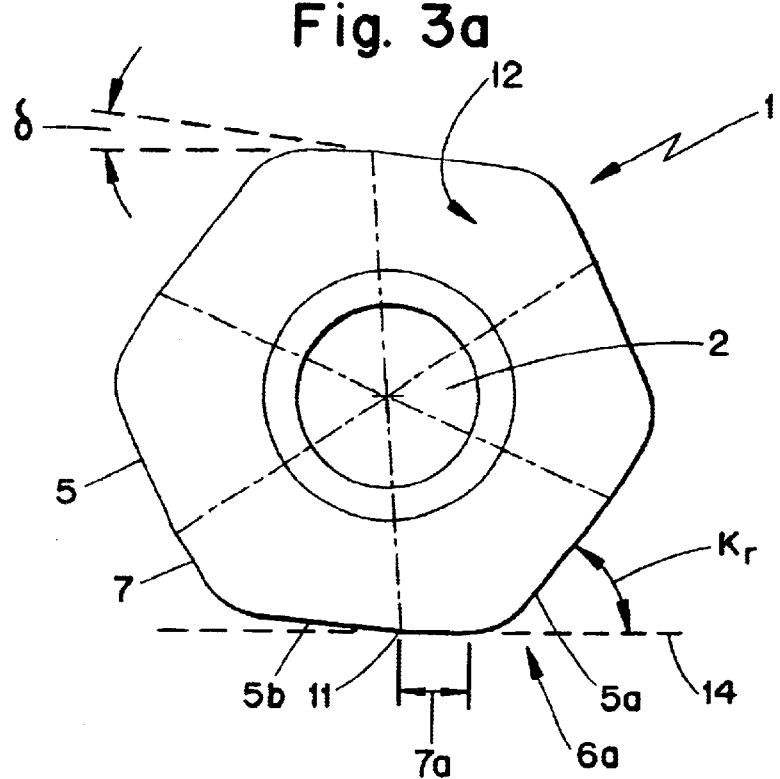
FIG. 3a shows the contour of a cutting bit with a short parallel land.

Referring to FIG. 1 shown therein is a cutting bit 1 with its lower support face 3 facing upwardly while the upper face 12 is not visible in this view (but see FIG. 3a). The lower support face 3 is of an exactly hexagonal shape with six bottom edges 9 and at its center has a fixing bore which extends perpendicularly to that face and which extends through the entire cutting bit 1 and which serves for fixing the bit by means of a clamping screw which is not shown here.

Thus, the bit has six sides or edge surfaces 16 associated with respective ones of the bottom edges. The edge surfaces 16 are not entirely planar and do not form a pure hexagon, however. Each edge surface comprises a first, trapezoidal relief or clearance faces 4', and a second, triangular clearance face 4. The first face 4 is bordered at its lower end by one of the edges 9 of the lower support face 3 and at its upper end by a secondary cutting edge 7 of the upper face, with the edges 9 and 7 being parallel to one another. The edge 7 is thus also known as a "parallel land". The second clearance face 4 is bordered at its lower end by a point contact with the lower face 3, and at its upper end by a main cutting edge 5 of the upper face 12. The two faces 4, 4' of each edge surface 16, being non-coplanar, form a line of demarcation 20 where they intersect. That line 20 extends from the point where the second face 4 joins the lower face 3, to a point 11 where the secondary edge 7 meets the primary edge 5 (i.e., the point 11 defines a break or bend in the upper edge 35 of the respective edge surface 16).

In operation, however, the main cutting edge 5 and the secondary edge 7 which are associated with the same side edge surface 16 of the hexagon are not active simultaneously; rather, next to an active main cutting edge 5 there is also active a secondary edge 7 which adjoins the same cutting corner 6 which the main cutting edge 5 also adjoins. Stated another way, the active edges in FIGS. 2 and 3a would be the main and secondary edges designated as 5a and 7a, respectively, disposed at the active cutting corner 6a. (Note that FIG. 3a is a top view, whereas FIG. 2 is a bottom view, so the active cutting corner is at the right side in FIG. 3a and at the left side in FIG. 2).

Because of the angled configuration of the secondary edge 7a with respect to the main cutting edge 5b which are associated with the same edge surface 16 of the hexagon, the main cutting edge 5b in question does not come into contact with the workpiece when the secondary edge 7a in question is active and in the milling operation is producing a flat surface on the workpiece. FIG. 2, which is a plan view of the lower face 3, better shows the outline contour of the upper face 12 which differs slightly from an exactly hexagonal shape (which upper face substantially defines the rake face of the hexagonal cutting bit). The cutting corners 6 are slightly rounded, and each side of the hexagon in the plane of the upper face 12 is defined by a main cutting edge 5 and a secondary edge 7 (e.g., edges 7a and 5b in FIG. 2) which are slightly angled with respect to one another. By virtue of that angled configuration and the specific configuration of the clearance faces 4, 4', it will also be seen that the axial clearance angles of the main cutting edge 5 must be smaller than the axial clearance angle of the corresponding secondary edge 7, which however is of no significance as regards the cutting properties of the main cutting edge 5, because the main cutting edge 5 does not come into engagement with the workpiece in the axial direction, but only in the radial direction. In regard to the cutting edge 5 which is active in the radial direction, however, the cutting bit in any case has a negative position of installation, that is to say, a negative rake angle (not shown).

It will be appreciated that the bit 1 will be secured in a cutting seat of a holder (not shown) wherein the lower face 3 will rest on a bottom surface, or on a shim, of the holder, and two of the edge surfaces 16 will engage respective abutment surfaces of the holder. In particular, contact surface areas 8 of those two edge surfaces will engage the abutment surfaces, as shown by phantom (dash-dot) lines in FIG. 2, which assumes that the cutting corner 6a is the active cutting corner.

Figure 2:
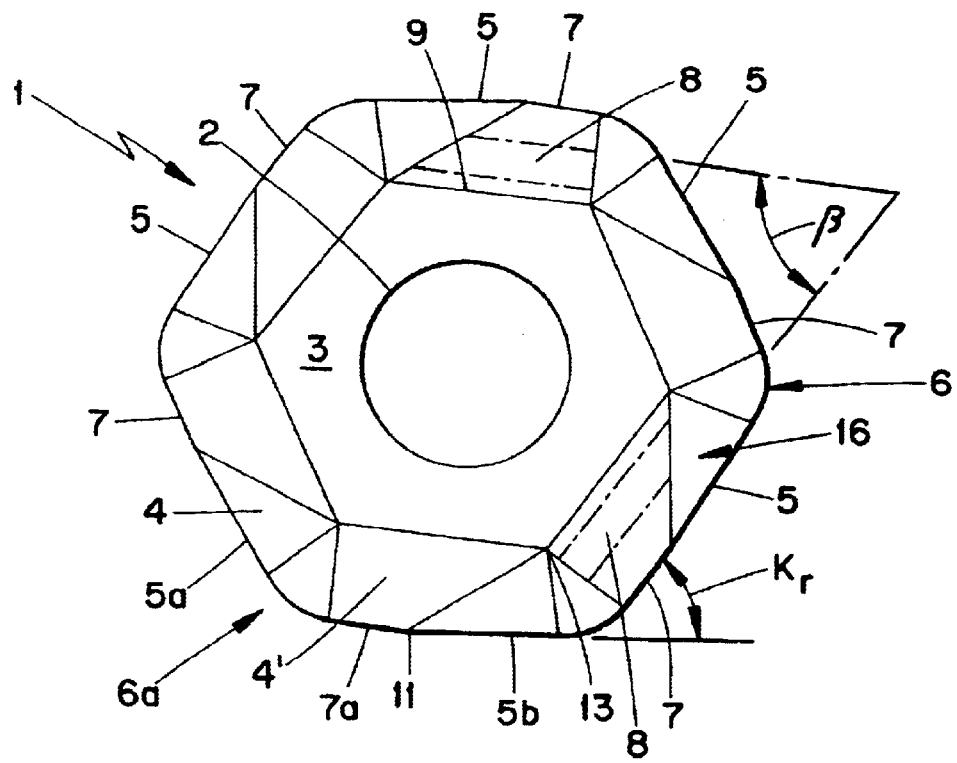
FIG. 2 is a view of the cutting bit from below which shows rounded corners.

As can further be seen from FIG. 2, the contact areas 8 are defined along two of the trapezoidal clearance faces 4'. This serves to clearly illustrate the fact that in each case only two of the contact areas as such are active in supporting the bit, and they include with each other an angle β of (in this case exactly) 60°. The main cutting edges 5 of the two respective clearance faces in question exactly include that angle with each other, but in each case the angle $K_r$ between an active secondary edge 7 and the active main cutting edge 5 adjoining the same cutting corner is always less than 60°, typically being of the order of magnitude of 55° (i.e., between 50° and 59° and more preferably between 53° and 58°).

It will be appreciated that the bend angle δ along a side of the hexagon between the main cutting edge 5 and the secondary edge 7 then respectively corresponds to the difference between the angles β and $K_r$ (e.g., 5° if the angles β and $K_r$ are 60° and 55°). Since the active secondary edge 7 is set in a plane oriented perpendicularly to the axis of rotation of the tool, the setting angle $K_r$ of the adjoining main cutting edge 5 is precisely the angle which the main cutting edge 5 and the secondary edge 7 include with each other, and is therefore of the order of magnitude of 55°. That means that $K_r$ equals 60° minus δ.

FIG. 3a shows a plan view of the upper face 12 of the above-discussed cutting bit, more specifically being illustrated in a position in which the horizontal plane 14 corresponds to the feed plane or the plane perpendicularly to the axis of rotation of the milling tool so that the active secondary edge 7a extends exactly horizontally. The active main cutting edge 5a is then arranged at a setting angle $K_r$ of about 55°. The cutting bit therefore appears to be slightly tilted.

Figure 3B:
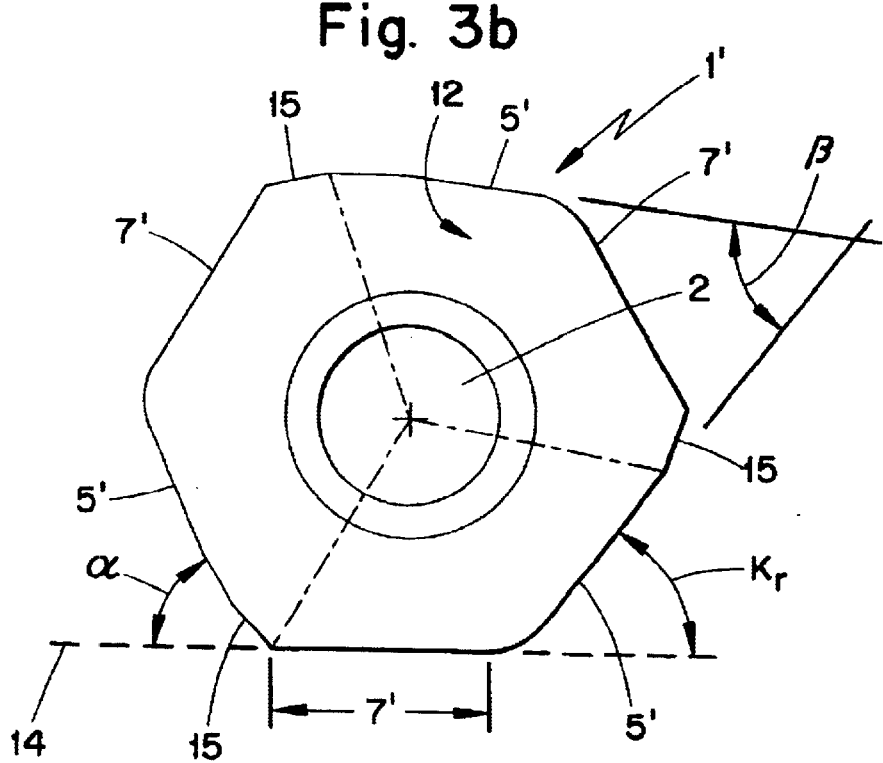
FIG. 3b shows the contour of a modified cutting bit with a long parallel land.

FIG. 3b shows a modified cutting bit 1' in which each secondary edge 7' is markedly prolonged so that it occupies practically the entire respective side of the basic hexagonal shape. In this configuration there is no longer any inactive main cutting edge corresponding to the edge 5b of FIG. 3a. In this case, the active cutting edge 5' adjoins the active secondary edge 7' at an angle $K_r'$ of less than 60°. In order to ensure that mutually corresponding portions, in particular the secondary edges 7' provided at alternating sides of the hexagon (and also the main cutting edges 5' provided at alternating sides of the hexagon), include with each other an angle β of about 60° (three-fold axis of symmetry), an edge portion 15 is formed at each junction where a secondary edge 7' and a main edge 5' come together. The edge portion 15 is inclined relative to both the secondary and main edges 7', 5'. The edge portion 15 is not absolutely required, because at that junction the secondary edge 7' can (and must) bend through more than 60° with respect to the main cutting edge 5', but this shape of the edge portion 15 enjoys the advantage that the cutting bit can then be more easily designed in such a way that it fits into the same cutting bit receiving means, such as the cutting bit shown in FIG. 3a. This cutting bit 1' ("broad smoothing finishing plate") as shown in FIG. 3b is suitable for milling operations with particularly high feed speeds, because the long secondary edge 7' provides for a flat workpiece surface even with a high feed rate.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A milling cutter bit comprising:
    a substantially flat upper face, at least a portion of which defines a rake face, the upper face being of substantially hexagonal shape,
    a lower support face disposed substantially parallel to the upper face and being of substantially hexagonal shape, and
    an edge surface including six sides each interconnecting the upper and lower faces, each side including first and second faces oriented in non-coplanar relationship, wherein each first face intersects the upper face to form therewith a secondary cutting edge, and each second face intersects the upper face to form therewith a main cutting edge arranged non-colinearly with respect to the secondary cutting edge, wherein alternating ones of the first faces form a first angle of substantially 60° to one another, and alternating ones of the second faces form a second angle of substantially 60° to one another.

2. The milling cutter bit according to claim 1 wherein each secondary edge and a respective main cutting edge converge toward a respective cutting corner of the bit, the secondary edge approaching the cutting edge at a third angle less than 60°.

3. The milling cutter bit according to claim 2 wherein the third angle is between 50° and 59°.

4. The milling cutter bit according to claim 3 wherein the third angle is between 53° and 58°.

5. The milling cutter bit according to claim 3 wherein a main cutting edge and a secondary cutting edge that are associated with a respective one of the six sides are angled at 1° to 10° relative to one another.

6. The milling cutter bit according to claim 1 wherein a main cutting edge and a secondary cutting edge that are associated with a respective one of the six sides are angled at 1° to 10° relative to one another.

7. The milling cutter bit according to claim 1 wherein a main cutting edge and a secondary cutting edge that are associated with a respective one of the six sides are angled by 2°–7° relative to one another.

8. The milling cutter bit according to claim 1 wherein each of the first faces forms a first clearance angle relative to the upper face, and each of the second faces forms a second clearance angle relative to the upper face, the first clearance angle being larger than the second clearance angle.

9. The milling cutter bit according to claim 1 wherein each of the first faces is of generally trapezoidal shape, and each of the second faces is of generally triangular shape.

10. The milling cutter according to claim 1 wherein each secondary cutting edge extends parallel to a respective one of six edges of the hexagonal lower support face.

11. A milling tool comprising:
    a carrier rotatable about an axis and defining a plurality of circumferentially spaced seats, each seat including two support surfaces forming an angle of substantially 60° with one another;
    a plurality of milling cutter bits received in respective seats, each milling cutter bit comprising:
        a substantially flat upper face, at least a portion of which defines a rake face, the upper face being of substantially hexagonal shape,
        a lower support face disposed substantially parallel to the upper face and being of substantially hexagonal shape, and
        an edge surface including six sides each interconnecting the upper and lower faces, each side including first and second faces oriented in non-coplanar relationship, wherein each first face intersects the upper face to form therewith a secondary cutting edge, and each second face intersects the upper face to form therewith a main cutting edge arranged non-colinearly with respect to the secondary cutting edge, wherein alternating ones of the first faces form a first angle of substantially 60° to one another, and alternating ones of the second faces form a second angle of substantially 60° to one another, wherein the first faces engage respective ones of the support surfaces of the seat.

12. The milling tool according to claim 11 wherein each secondary edge and a respective one of the main cutting edges converge toward a respective cuffing corner of the bit to form a third angle less than 60°.

13. The milling tool according to claim 12 wherein the third angle is between 50° and 59°.

14. The milling tool according to claim 13 wherein the third angle is between 53° and 58°.

15. The milling tool according to claim 11 wherein each secondary cuffing edge extends parallel to a respective one of six edges of the hexagonal lower support face.

* * * * *